(12) United States Patent
Zhou et al.

(10) Patent No.: US 11,476,947 B2
(45) Date of Patent: Oct. 18, 2022

(54) LOW POWER COHERENT RECEIVER FOR SHORT-REACH OPTICAL COMMUNICATION

(71) Applicant: Google LLC, Mountain View, CA (US)

(72) Inventors: Xiang Zhou, Sunnyvale, CA (US); Hong Liu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/421,666

(22) Filed: May 24, 2019

(65) Prior Publication Data

US 2020/0374011 A1   Nov. 26, 2020

(51) Int. Cl.
    *H04B 10/06*     (2006.01)
    *H04B 10/61*     (2013.01)

(52) U.S. Cl.
    CPC ..... *H04B 10/6165* (2013.01); *H04B 10/6162* (2013.01)

(58) Field of Classification Search
    CPC .... H04B 10/142; H04B 10/61; H04B 10/616; H04B 10/6165; H04B 10/6162;
(Continued)

(56) References Cited

U.S. PATENT DOCUMENTS 5,389,898 A     2/1995   Taketoshi et al.
5,991,347 A * 11/1999   Kim ....................... H04L 25/14
                                                713/400
(Continued)

FOREIGN PATENT DOCUMENTS

WO    2014032694 A1    3/2014
WO    2014194940 A1   12/2014

OTHER PUBLICATIONS

Inwoong Kim, et al, "Mitigation and Monitoring of the Impact of Extinction Ratio of IQ-Modulator on Nyquist M-QAM Signals," IEEE Photonics Technology Letters, vol. 26, No. 2, Jan. 15, 2014, pp. 177-179.

(Continued)

*Primary Examiner* — Pranesh K Barua
(74) *Attorney, Agent, or Firm* — Lerner, David, Littenberg, Krumholz & Mentlik, LLP (57) ABSTRACT

A low-power coherent receiver is enabled with enhanced performance for intra-datacenter reach optical interconnection applications using several techniques. The first is a coherent skew adjustment technique which enables lower-power baud-rate ADC sampling and baud-rate-spaced coherent equalization. The second is a real-valued or mixed-valued low-power coherent equalization technique, where a single-tap real-valued 4×4 MIMO equalizer plus four real-valued or two mixed-valued single-input single-out (SISO) equalizers are used for simultaneous polarization recovery, in-phase and quadrature (I/Q) phase error correction, and bandwidth equalization. The third is a power-efficient dual-DSP architecture to enhance coherent receiver performance, in which a complementary low-speed coherent DSP is introduced for optimal I/Q phase error correction and constellation decision parameters determination through more sophisticated algorithms that are too power hungry to be implemented in the primary high-speed DSP.

16 Claims, 8 Drawing Sheets

(58) Field of Classification Search
CPC . H04B 10/2569; H04B 10/6971; H04J 14/06; H04L 27/223

See application file for complete search history.

(56) References Cited

U.S. PATENT DOCUMENTS

| | | | | |
|---|---|---|---|---|
| 6,473,013 B1* | 10/2002 | Velazquez | H03M 1/1215 | 341/118 |
| 7,916,050 B1* | 3/2011 | Mujica | H03M 1/004 | 455/108 |
| 8,447,186 B2* | 5/2013 | Tanimura | H04B 1/12 | 398/147 |
| 8,781,333 B2* | 7/2014 | Hauske | H04B 10/616 | 398/155 |
| 8,867,603 B1* | 10/2014 | Lida | H04L 27/01 | 375/233 |
| 9,036,751 B1* | 5/2015 | Wang | H04B 10/0795 | 375/350 |
| 9,240,843 B1* | 1/2016 | Malouin | H04B 10/616 | |
| 9,602,116 B1* | 3/2017 | Le | H03M 1/121 | |
| 9,673,910 B1* | 6/2017 | Crivelli | H04B 10/6162 | |
| 9,749,060 B1* | 8/2017 | Wang | H04B 10/614 | |
| 10,038,498 B1* | 7/2018 | Fan | H04B 7/0413 | |
| 10,110,317 B1* | 10/2018 | Morero | H04B 7/0413 | |
| 2002/0012152 A1* | 1/2002 | Agazzi | H03M 1/0624 | 398/202 |
| 2003/0174767 A1* | 9/2003 | Fujii | H04B 7/005 | 375/229 |
| 2006/0206689 A1* | 9/2006 | Hirano | G06F 13/28 | 712/200 |
| 2009/0317092 A1* | 12/2009 | Nakashima | H04B 10/6165 | 398/204 |
| 2010/0040129 A1* | 2/2010 | Kim | H04L 27/38 | 375/232 |
| 2010/0098411 A1* | 4/2010 | Nakashima | H04B 10/60 | 398/208 |
| 2010/0178065 A1* | 7/2010 | Nishihara | H04B 10/613 | 398/202 |
| 2010/0253414 A1* | 10/2010 | Dedic | H03M 1/002 | 327/415 |
| 2010/0266291 A1* | 10/2010 | Boffi | H04B 10/6161 | 398/159 |
| 2011/0229137 A1* | 9/2011 | Gripp | H04J 14/021 | 398/65 |
| 2012/0121274 A1* | 5/2012 | Fludger | H04B 10/6165 | 398/208 |
| 2012/0281746 A1* | 11/2012 | Herrmann | H04B 3/32 | 375/229 |
| 2013/0108276 A1* | 5/2013 | Kikuchi | H04B 10/697 | 398/158 |
| 2013/0202064 A1* | 8/2013 | Chmelar | H04L 25/03057 | 375/340 |
| 2014/0169499 A1* | 6/2014 | Riani | H03K 9/02 | 375/340 |
| 2015/0023659 A1* | 1/2015 | Sun | H04B 10/616 | 398/34 |
| 2015/0171972 A1* | 6/2015 | Xie | H04B 10/6161 | 398/208 |
| 2016/0094297 A1* | 3/2016 | Xie | H04L 7/027 | 398/202 |
| 2017/0006218 A1* | 1/2017 | Naruse | H04N 9/77 | |
| 2017/0338895 A1* | 11/2017 | Yasuda | H04J 11/00 | |
| 2018/0159652 A1* | 6/2018 | Calabro | H04B 10/6971 | |
| 2018/0323871 A1 | 11/2018 | Fan et al. | | |

OTHER PUBLICATIONS

R. Urata, H. Liu, X. Zhou and A. Vahdat, "Datacenter interconnect and networking: From evolution to holistic revolution", OFC 2017, 3 pages.

OIF. Technical Work > Hot Topics > 400ZR. 2019. 4 pages. URL for Website: <https://www.oiforum.com/technical-work/hot-topics/400zr-2/>.

A. Josten, B. Baeuerle, M. Song, E. Pincemin, D. Hillerkuss, and J. Leuthold, "Modified Godard Timing Recovery for Non-Integer Oversampling Receivers," Appl. Sci. 2017, 7, 655. 14 pages.

Pittala, F., Nossek, J.A., "Efficient Frequency-Domain Fractionally-Spaced Equalizer for Flexible Digital Coherent Optical Networks", Optical Communication (ECOC), 2015 European Conference on p. 3.14, 3 pages.

K. Matsuda, et al., "Hardware-efficient Adaptive Equalization and Carrier Phase Recovery for 100 Gb/s/?-based Coherent WDM-PON Systems",ECOC 2017, paper Th.1.B., 3 pages.

J. Cheng et al, "A Low-Complexity Adaptive Equalizer for Digital Coherent Short-Reach Optical Transmission Systems", OFC 2019, paper M3H.2, 3 pages.

Xiang Zhou, Ryohei Urata and Hong Liu, "Beyond 1Tb/s Datacenter Interconnect Technology: Challenges and Solutions," OFC 2019, paper Tu2F.5, 3 pages.

K.H. Mueller, M. S. Müller, "Timing recovery in digital synchronous data receivers," IEEE Trans. Commun., vol. COM-24, pp. 516-531, May 1976.

D. Wang, M. Zhang, Z. Li, Y. Cui, J. Liu, Y. Yang, and H. Wang, "Nonlinear decision boundary created by a machine learning-based classifier to mitigate nonlinear phase noise," in European Conference on Optical Communication (ECOC) 2015, Oct. 2015, pp. 1-3.

Yang et al., "A Serial-Link Transceiver Based on 8-GSamples/s A/D and D/A Converters in 0.25-μm CMOS", IEEE Journal of Solid-State Circuits, vol. 36, No. 11, Nov. 2001. pp. 1684-1692.

Office Action for Taiwanese Patent Application No. 108143172 dated Sep. 30, 2020. 7 pages.

International Search Report and Written Opinion for International Application No. PCt/US2019/062221 dated Feb. 21, 2020. 16 pages.

\* cited by examiner

LOW POWER COHERENT RECEIVER FOR SHORT-REACH OPTICAL COMMUNICATION

BACKGROUND

An ever-growing bandwidth demand continues to drive a need for higher-speed optical interconnection networks, such as intra-datacenter links. To scale the interconnection interface bandwidth beyond 1 Tb/s (1.6 Tb/s, 3.2 bit/s and beyond), more bandwidth-efficient coherent optical transmission technologies are likely needed. A "coherent" optical transmission system is characterized by its capability to do "coherent detection," meaning that an optical receiver can track the phase of an optical transmitter to extract any phase and frequency information carried by a transmitted signal, and therefore allow encoding and decoding information over both the amplitude and phase dimension of a light (for each polarization). Coherent technology has the potential to achieve higher link budget, require less active optical components such as lasers, and is also more tolerant toward several optical transmission impairments, such as the in-band optical interference, fiber dispersion, as well as laser relative intensity noise (RIN). Fiber dispersion is still not a problem until 800 Gb/s, but could become a problem for future multi-Tb/s systems if current intensity modulation with direct detection (IM/DD) based coarse wavelength division multiplexing (CWDM) technologies are used. The impact of laser RIN also increases with baud rate and the modulation level. Increasing baud rate to beyond current 56 Gbaud and modulation level beyond 4 levels would likely require scaling bandwidth beyond 1 Tb/s for intra-datacenter links.

Coherent optical transmission technology, which is predominantly used in long-haul (LH) and metro networks, still faces several challenges for intra-datacenter applications. The first is power-hungry coherent digital signal processing (DSP). The second is the need for lasers with higher phase stability and modulators with higher extinction ratio (ER). The third is the backward compatibility requirement for certain applications. Regarding the first challenge, although significant progress has been made in recent years, the state-of-the-art coherent DSP power is still prohibitively high for intra-datacenter applications. For example, at a 7 nm node, 400 G coherent ZR, which represents the lowest-power 400 G coherent DSP, is still about 70% higher than IM/DD-based 400 G solutions. Accordingly, there is a need for solutions capable of further reducing coherent DSP power for intra-datacenter reach applications.

Up to present, three types of methods have been used or proposed to reduce coherent receiver DSP power. The first is to move to more advanced CMOS node. The second is to use fractional (non-integer) oversampling technique to reduce oversampling rate from traditional 2 to about 1.2. The third is to simplify the coherent equalizer design. For example, DSP power saving can be achieved by combining the conventional frequency-domain fiber chromatic dispersion (CD) equalizer and the time-domain polarization mode dispersion (PMD) multiple input multiple output (MIMO) equalizer into a single frequency-domain equalizer (FDE). But this method is effective only for metro or LH systems where the required equalizer length is significantly larger than that required by the intra-datacenter systems. As another example, a single-tap 2×2 complex-valued MIMO equalizer can be used for polarization recovery, while CD and bandwidth equalization is achieved by two complex-valued single-input single output (SISO) linear feedforward equalizers (FFEs). However, this method is very sensitive to coherent receiver path delays or skews. To address this coherent skew problem, an additional 3-tap 4×4 MIMO equalizer can be used for coherent skew correction, at the expense of increased power consumption. Up to present, all the proposed simplified coherent equalization methods still require analog-to-digital conversion (ADC) oversampling and fractionally-spaced equalization for practical implementation.

BRIEF SUMMARY

The system and method described herein further reduce coherent receiver DSP power by using baud-rate ADC sampling and baud-rate spaced coherent equalization. The present disclosure proposes a power-efficient dual-DSP architecture to enhance coherent receiver performance for short reach coherent systems.

Several techniques are described herein to enable a low-power coherent receiver with enhanced performance for intra-datacenter reach optical interconnection applications. The first is a coherent skew adjustment technique which enables lower-power baud-rate ADC sampling and baud-rate-spaced coherent equalization. The second is a real-valued low-power coherent equalization technique, where a single-tap real-valued 4×4 MIMO equalizer plus four real-valued single-input single-out (SISO) equalizers are used for simultaneous polarization recovery, in-phase and quadrature (I/Q) phase error correction, and bandwidth equalization. The third is a power-efficient dual-DSP architecture to enhance coherent receiver performance, in which a complementary low-speed (non-streaming) coherent DSP is introduced for optimal I/Q phase error correction and constellation decision parameters determination through more sophisticated algorithms that are too power hungry to be implemented in the primary (streaming) high-speed DSP. Combined use of these three techniques not only enables overall coherent receiver power reduction, but also improves overall receiver performance for short reach optical communication.

One aspect of the disclosure provides a method of processing received optical signals at a coherent receiver. The method includes receiving, at a plurality of analog-to-digital converter (ADC) sampling clocks, a plurality of separate optical signals, performing, at a high-speed digital signal processor (DSP) high-speed processing of each of the plurality of signals, without an independent in-phase/quadrature (I/Q) phase compensation unit, the high-speed processing achieving bandwidth equalization and polarization recovery, and directly introducing different time delays to each of the plurality of ADC sampling clocks. Directly introducing the different time delays to each of the plurality of ADC sampling clocks may include using a plurality of separate delay adjustable clock buffers following clock distribution in a clock recovery loop. In other examples, it may include using a separate voltage controlled oscillator (VCO) in a clock recovery loop for each ADC sampling clock, each VCO using information from a common baud rate clock phase error detector.

According to some examples, performing the high-speed processing of each of the plurality of signals may include processing the signals using two different types of real-valued or mixed-value equalizers, such as by inputting each of the plurality of signals to one of a plurality of real-valued or mixed-value multi-tap single input single output (SISO) equalizers; and inputting the plurality of signals into a real-valued single tap multiple input multiple output (MIMO) equalizer. In some examples, a low-speed DSP in parallel with the high-speed DSP, the low-speed DSP performing block by block DSP, such as to find at least one of optical constellation decision parameters, I/Q phase error compensation parameters, or optimal equalizer tap coefficients for input to the high-speed DSP.

Another aspect of the disclosure provides a low-power coherent optical receiver, including a plurality of analog-to-digital converter (ADC) sampling clocks adapted to receive a plurality of separate optical signals, a high-speed digital signal processors (DSP) configured to perform high-speed processing of each of the plurality of signals, without an independent in-phase/quadrature (I/Q) phase compensation unit, the high-speed processing achieving bandwidth equalization and polarization recovery, and a baud rate clock phase error detector in a clock recovery loop that directly introduces different time delays to each of the plurality of ADC sampling clocks. The clock recovery loop may include a plurality of separate delay adjustable clock buffers following clock distribution, or a separate voltage controlled oscillator (VCO) for each ADC sampling clock, each VCO using information from the baud rate clock phase error detector.

According to some examples, the high-speed DSP further includes two different types of real-valued or mixed-value equalizers, such as a plurality of multi-tap single input single output (SISO) equalizers, and a single-tap multiple input multiple output (MIMO) equalizer. The receiver may further include a low-speed DSP in parallel with the high-speed DSP, wherein the low-speed DSP is configured to perform block by block DSP, such as to find at least one of optical constellation decision parameters, I/Q phase error compensation parameters, or optimal equalizer tap coefficients for input to the high-speed DSP.

DETAILED DESCRIPTION

Figure 1:
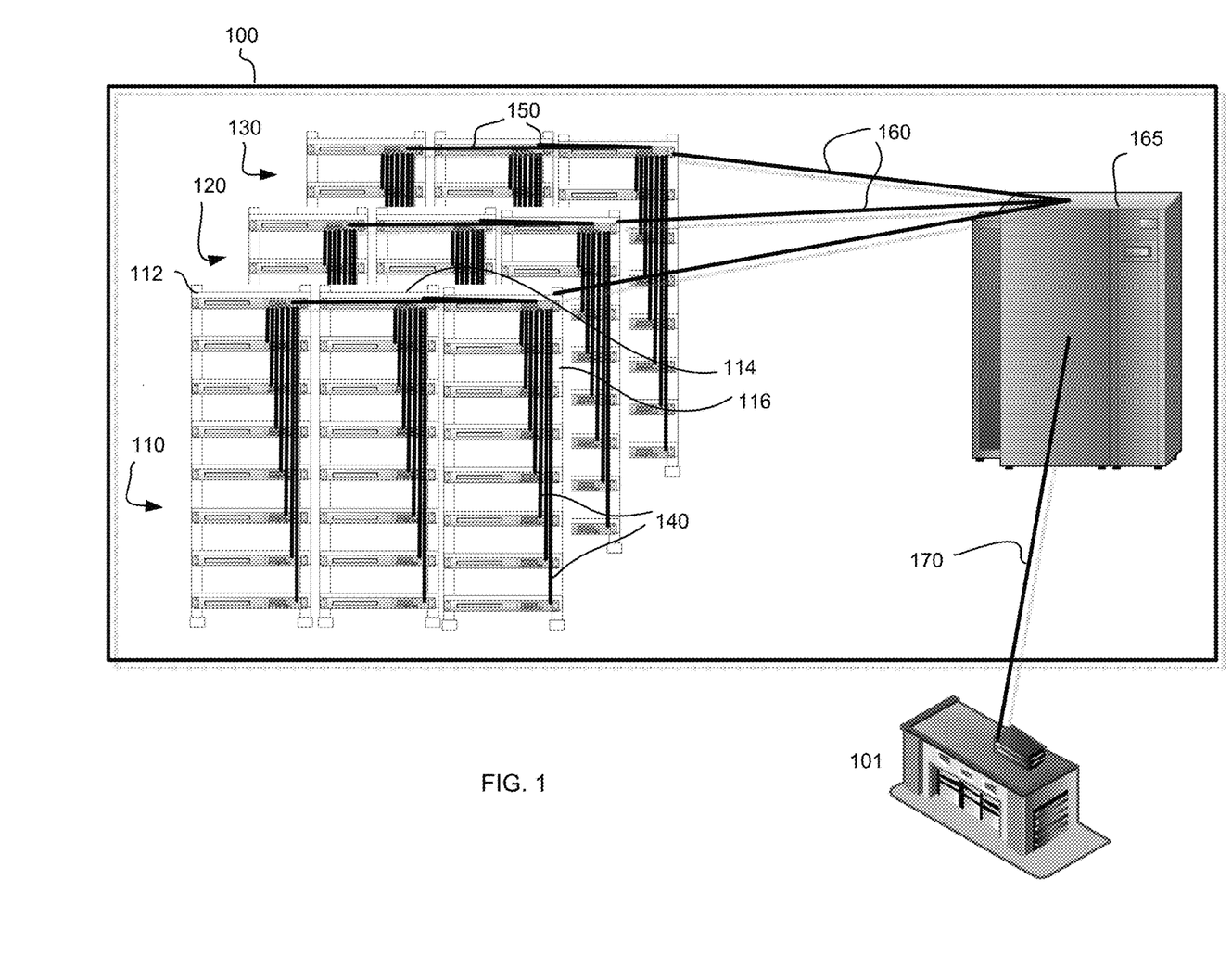
FIG. 1 is a pictorial diagram illustrating interconnection of nodes in a datacenter according to aspects of the disclosure.

FIG. 1 illustrates a datacenter 100 including a plurality of racks 112, 114, 116, each rack shelving a plurality of nodes, such as servers, switches, routers, storage devices, etc. The nodes may be capable of optical communication, and therefore may include transmitters and receivers for communicating over optical links. The nodes within a rack may be interconnected by links, such as intra-rack links 140. A plurality of racks may be arranged in a plurality of rows 110, 120, 130. Some or all of the nodes within a row may also be interconnected, such as by intra-row links 150. Further, one or more of the nodes within a rack or row may be coupled to a core computing device 165, such as by core links 160. Any of the intra-rack links 140, intra-row links 150, and core links 160 may be considered intra-datacenter links. According to some examples, the datacenter 100 may also be coupled to another datacenter 101, which may be in a remote geographical location or on a same campus, by inter-datacenter link 170.

Some or all of the intra-datacenter links may be optical links, such as fiber ribbon links, bit-parallel wavelength division multiplexed (WDM) links, etc, over either multi-mode fiber (MMF) or single mode fiber (SMF). The optical links may be configured for transmission over relatively short distances, such as 2 km or less.

While the nodes of the datacenter 100 of FIG. 1 are illustrated in a particular arrangement, it should be understood that the datacenter 100 may includes nodes arranged in any of a variety of different architectures. For example, one possible architecture is a layered architecture, including core, aggregation, and access layers. In this example, the core layer may provide a high-speed packet switching backplane for all flows going in and out of the data center. Aggregation layer modules may provide for functions such as service module integration, Layer 2 domain definitions, spanning tree processing, default gateway redundancy, content switching, firewall, SSL offload, intrusion detection, network analysis, firewall and server load balancing, etc. In the access layer, the servers may physically attach to the network. Other possible architectures include, by way of example only, a multi-tier model, server cluster model, or any of a variety of other models.

Moreover, while the aspects of this disclosure are described primarily with respect to intra-datacenter links, it should be understood that the features described are also applicable to other types of link, such as from a central office to home, enterprise links, etc.

Figure 2:
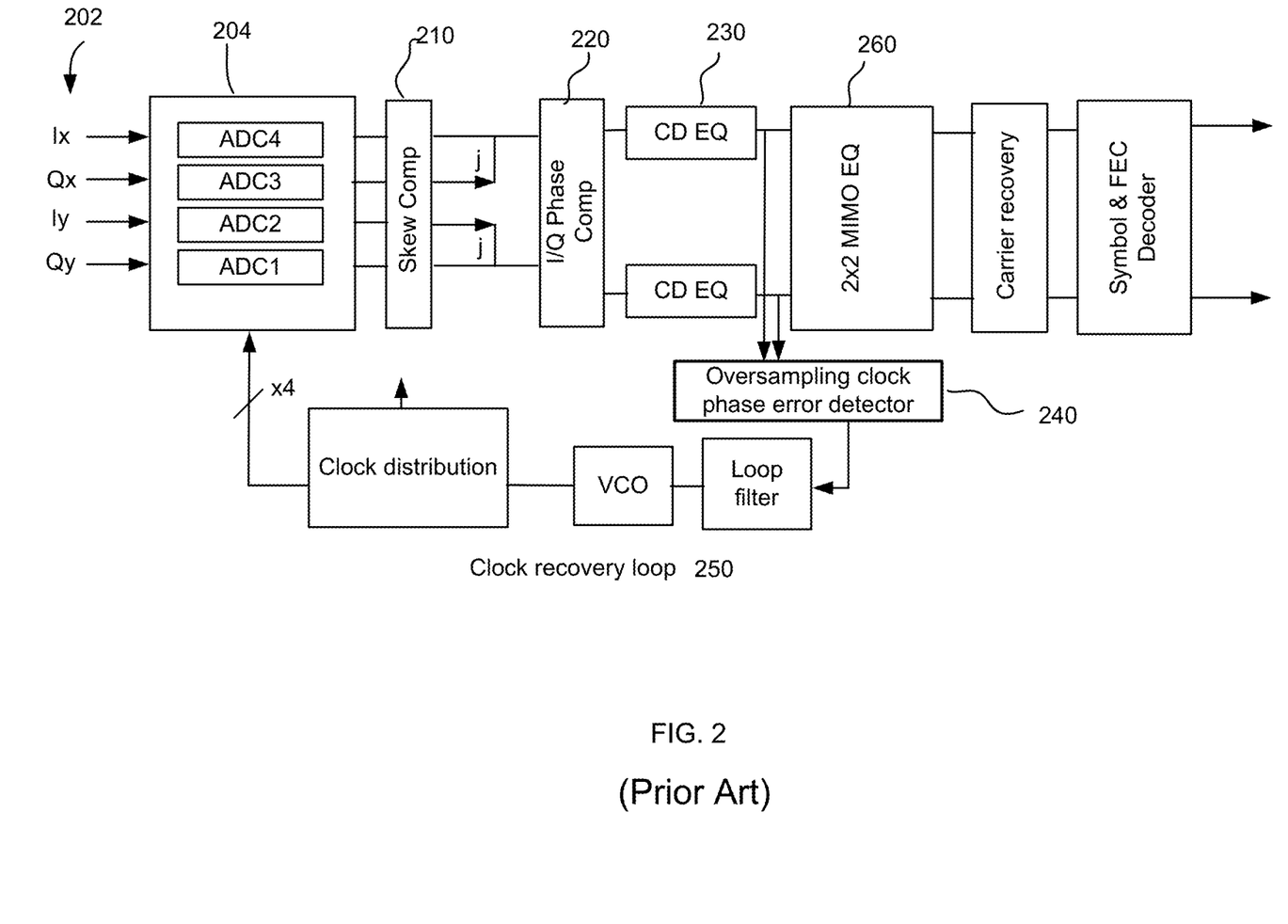
FIG. 2 is a circuit diagram of a conventional receiver according to the prior art.

FIG. 2 illustrates a conventional receiver for short range optical communications. Conventionally, all pragmatic coherent receivers have used ADC oversampling and fractional-spaced equalization, where equalizer tap spacing is smaller than a symbol period. Lower-power baud-rate sampling and baud-rate spaced equalization techniques have been used in short reach IM/DD PAM4 systems, but baud-rate sampling and equalization (BRSE) techniques have not been achievable in coherent systems for two main reasons. First, the BRSE technique is sensitive to ADC sampling time, and optimal performance can only be achieved by sampling at the center of each signal pulse. Such a requirement can be challenging to meet for coherent systems that require joint processing of four received signals, the four signals including in-phase and quadrature components in two orthogonal polarizations. This is because there are unknown and variable time delays, or "skews," between the four signals. Second, the BRSE technique has limited fiber CD and PMD tolerance, which is unacceptable for traditional coherent use cases with significant fiber CD and PMD. For intra-datacenter use cases, fiber CD and PMD is usually much smaller due to the use of O-band wavelength as well as shorter transmission reach, typically less than 2 km.

As shown in FIG. 2, the coherent receiver has four inputs 202—two for in-phase and two for quadrature, with each of the in-phase and quadrature having an x polarization and a y polarization. Each of the inputs 202 receives a separate signal, and the signals need to be synchronized. Accordingly, the conventional coherent receiver requires a skew compensation module 210 and an I/Q phase compensation module 220 between ADC sampling clocks 204 and chromatic dispersion (CD) equalization 230. The skew compensation module 210 and I/Q compensation module 220 may be digital signal processors. Because traditional skew compensation methods are used, the conventional coherent receiver also requires ADC oversampling, and therefore includes an oversampling clock phase error detector 240 between CD equalization 230 and clock recovery loop 250.

Conventional coherent receiver 200 further includes a multi-tap complex-valued 2×2 MIMO equalizer 260 for simultaneous bandwidth equalization and polarization recovery, and two additional (equivalent) 2×2 real-valued MIMO equalizer for I/Q phase error compensation (functional block 220), since the 2×2 complex-valued MIMO equalizer is not effective for I/Q phase error compensation.

Figure 3:
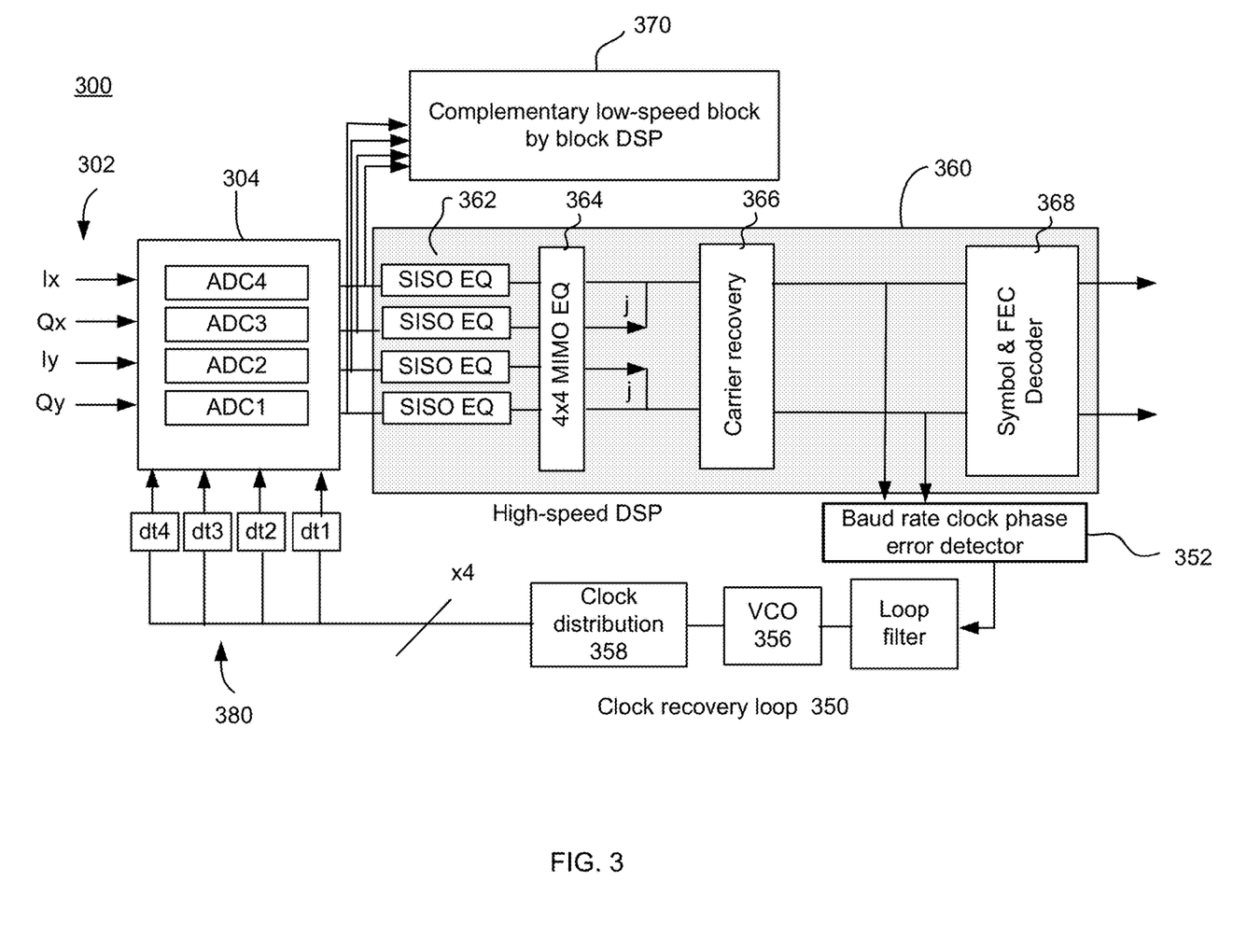
FIG. 3 is an example circuit diagram of a coherent receiver according to aspects of the disclosure.

FIG. 3 illustrates a novel dual-receiver design, enabling BRSE. As shown in this example, four ADC sampling clocks 304 receive signals from four input 302. The coherent receiver 300 does not require a skew compensation module or I/Q phase compensation module as shown in the conventional receiver. Rather, skew adjustment is performed by directly introducing different time delays to the four ADC sampling clocks. For example, a delay-adjustable clock buffer 380 follows clock distribution functional block 358 for each of the four ADC sampling clocks. In some examples, the delay adjustable clock buffer 380 could be integrated into the clock distribution unit.

The delay for each of the four clock buffers 380 can be individually or jointly optimized by monitoring phase errors detected by baud-rate clock phase error detector 352, which could be implemented by the classic Mueller-Mueller phase error detector using phase-recovered quadrature amplitude modulation (QAM) signals in both the X- and Y-polarizations. In some examples, one phase error detector 352 may be used to detect the averaged clock phase error over the four signal paths. A two-step optimization process could be used, wherein first the initial clock buffer delay is identical for all the four sampling clocks. Accordingly, the four clocks may be phase-synchronized. The common clock phase may be optimized by adjusting the phase of voltage controlled oscillator (VCO) 356. In the second step, once the common clock phase is optimized, individual clock phase may be fine-tuned, one at a time, by adjusting the corresponding clock buffer delay to minimize the average clock phase error. This skew compensation method may also be used for oversampled coherent systems, to remove the need for the additional skew compensation DSP required for the traditional coherent receiver.

The coherent receiver 300 of FIG. 3 also includes a power-efficient dual-DSP architecture. For example, a high-speed DSP 360 includes two different types of real-valued equalizers that achieve bandwidth equalization and polarization recovery. The operational speed of the high-speed DSP may be equal to the ADC sampling rate, which may be, for example, >50 GHz. The first type may be a real-valued multi-tap single input single output (SISO) equalizer 362 for each of the four ADC sampling clocks 304. The SISO equalizers 362 may be linear or nonlinear, and may be used for bandwidth equalization of the four input signals. The signals output from the SISO equalizer 362 may be input to the second type of equalizer, such as single-tap 4×4 real-valued MIMO equalizer 364, which may be used for polarization recovery and for phase error compensation. This single-tap 4×4 MIMO equalizer 364 may further achieve simultaneous receiver in-phase (I) and quadrature (Q) phase error compensation. As compared to the conventional receiver illustrated in FIG. 2, the receiver of FIG. 3 not only removes the need for independent I/Q compensation DSP, it also greatly reduces the bandwidth equalizer complexity due to the use of real-valued SISO equalizer. For example, to achieve the same bandwidth equalization capability, the receiver 300 may reduce the implementation complexity by about 75%. Whereas a single-tap complex-valued 2×2 MIMO linear equalizer requires 16 real-valued multiplication operations, 4 single-tap real-valued SISO linear equalizers only require 4 real-valued multiplication operations.

The four real-valued outputs from the MIMO equalizer 364 are converted into two complex-valued signals and then are sent into carrier recovery unit 366, which is output to symbol and forward error correction (FEC) decoder 368. In parallel, complementary low-speed DSP 370 may perform block by block DSP. In this regard, more sophisticated DSP algorithms, such as certain machine learning based algorithms, may be executed in a parallel low-speed non-streaming block by block coherent DSP 370 to help find optimal constellation decision parameters as well as the I/Q phase correction parameters for the primary high-speed coherent DSP 360. This low-speed DSP 370 may also help find the optimal equalizer tap coefficients if the link state change is relatively slow. The low-speed DSP may operate at a speed several orders lower than the ADC sampling speed, for example from 100 KHz to 100 MHz.

Figure 4:
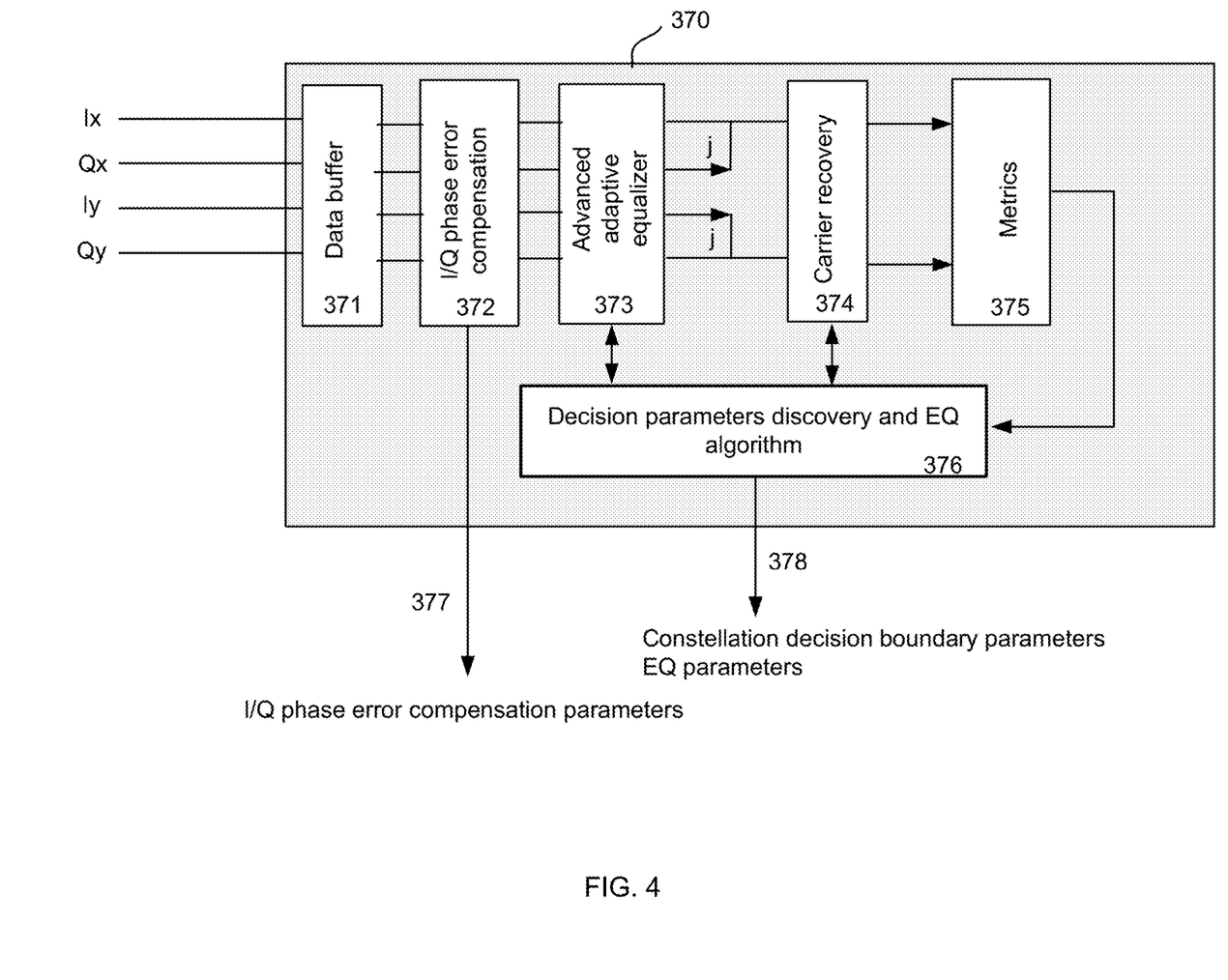
FIG. 4 is an example circuit diagram of a low-speed DSP according to aspects of the disclosure.

FIG. 4 illustrates an example of the low-speed DSP 370 in more detail. The complementary low-speed DSP 370 may be in a separate functional block from the receiver 300, but on a same or different integrated circuit.

As shown, the low-speed DSP 370 includes data buffer 371, and I/Q phase error compensation 372, which output I/Q phase error compensation parameters 377. The I/Q phase error compensation parameters can be expressed as a 2×2 real-valued matrix, consisting of four real-valued numbers.

The four signals output from the I/Q phase error compensation unit 372 are then input to advance adaptive equalizer unit 373, and then multiplexed into carrier recovery unit 374, both of which units interface with decision parameters discovery and equalizer (EQ) algorithm 376. The unit 376 employs certain adaptive equalization algorithms, for example, the common least mean square algorithm (LMS) to determine how to update the equalizer tap coefficients. This functional blocks also employs certain heuristic algorithms or the blind search algorithm to find the optimal constellation decision parameters. Metrics unit 375 may be used to find metrics such as signal to noise ratio (SNR), bit error ratio (BER), noise variance, etc. Output from the metrics unit 375 may also be output to the decision parameters discovery and EQ algorithm 376. In this regard, starting with an ideal case, parameters may be changed to look for SNR, and then find constellation decision boundary parameters and EQ parameters to optimize.

The constellation decision parameters may include an actual location of each constellation point as well as a decision boundary between neighboring constellation points. The location of each constellation point is used in symbol decision making in the equalizer and the carrier recovery circuits. For power-constrained short-reach coherent transmission systems employing low-cost components, a received signal constellation may be distorted/shifted due to insufficient modulator extinction ratio (ER) and non-negligible component nonlinearities, even without inter-symbol interference (ISI). For such a coherent system, the receiver performance strongly depends on the constellation decision parameters used for the equalizer. Non-optimal constellation decision parameters could result in significant performance penalty. But optimal constellation decision parameters can be hard to find using conventional least mean square (LMS)

based algorithms LMS based algorithms have been universally used for high-speed coherent equalizers due to their simplicity. However, implementing more sophisticated algorithms, such as certain machine learning based algorithms, directly into the high-speed DSP is impractical since power consumption and ASIC area cost could be too high for short-reach applications. By introducing the complementary low-speed non-streaming coherent DSP 370, more advanced DSP algorithms could be used to find optimal parameters required by the equalizer with negligible power and cost impact. Additionally, this low-speed DSP 370 may be used to find optimal I/Q phase error compensation parameter, which could be challenging to find with the conventional LMS based algorithms.

Figure 5:
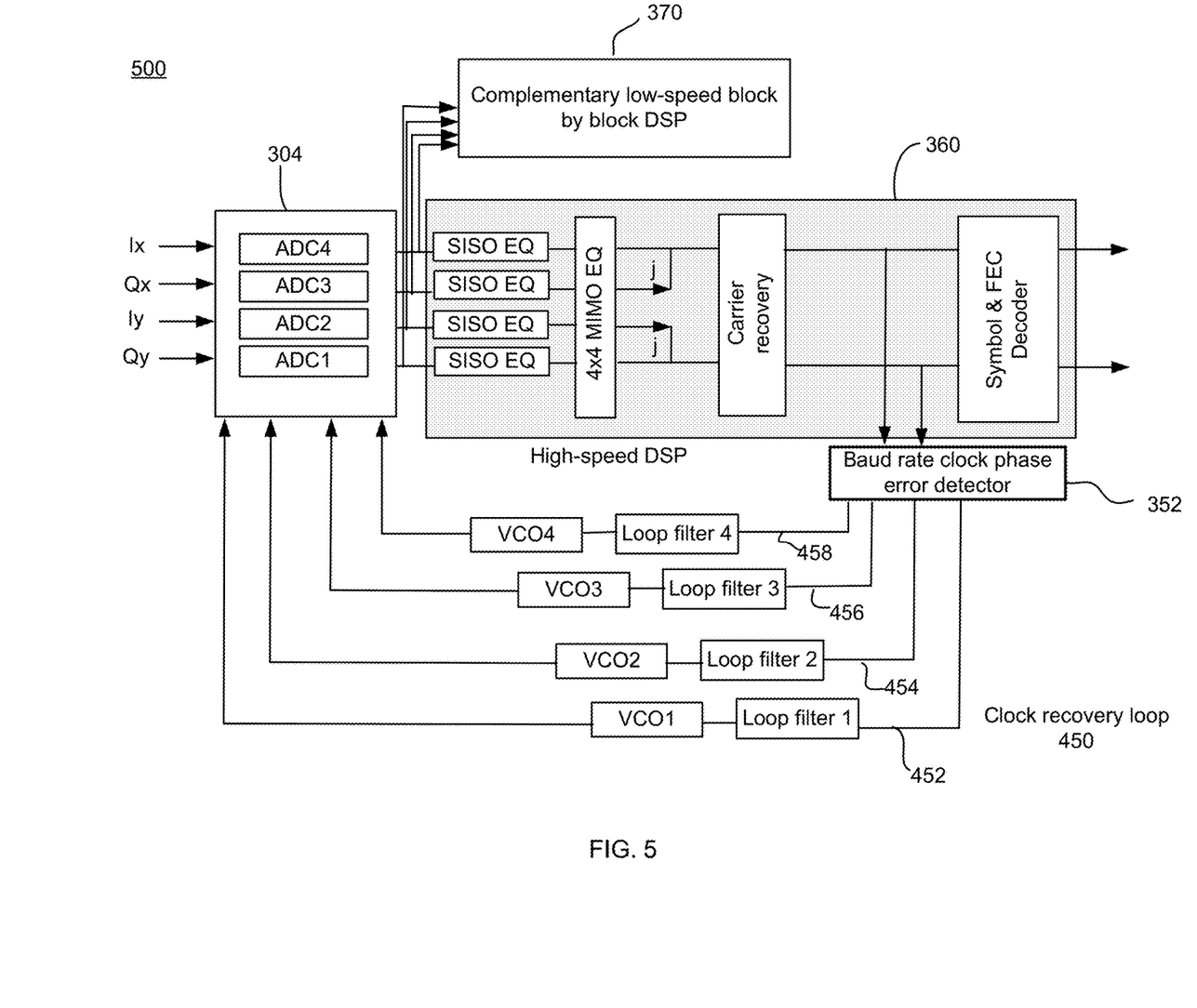
FIG. 5 is another example circuit diagram of a coherent receiver according to aspects of the disclosure.

FIG. 5 illustrates another example implementation of the skew adjustment technique. This implementation includes four clock recovery loops 552, 555, 556, 558 with a shared baud-rate phase error detector 352. Since there are four VCOs, skew adjustment can be achieved by operating each VCO at slightly different clock phase. This can be achieved by jointly optimizing the four VCOs by using a single clock phase error signal from the baud-rate phase error detector using the classic gradient based algorithms.

Figure 6A:
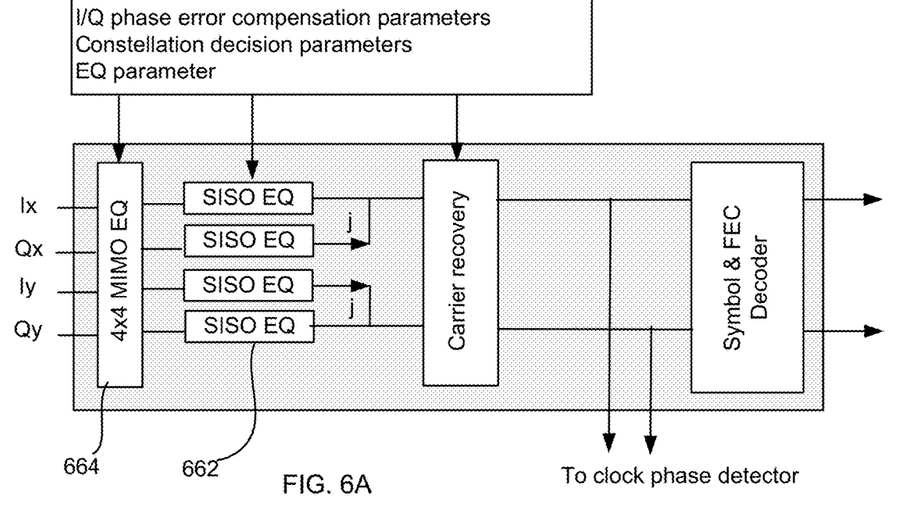
FIGS. 6A-B provide other example circuit diagrams of a coherent receiver according to aspects of the disclosure.
Figure 6B:
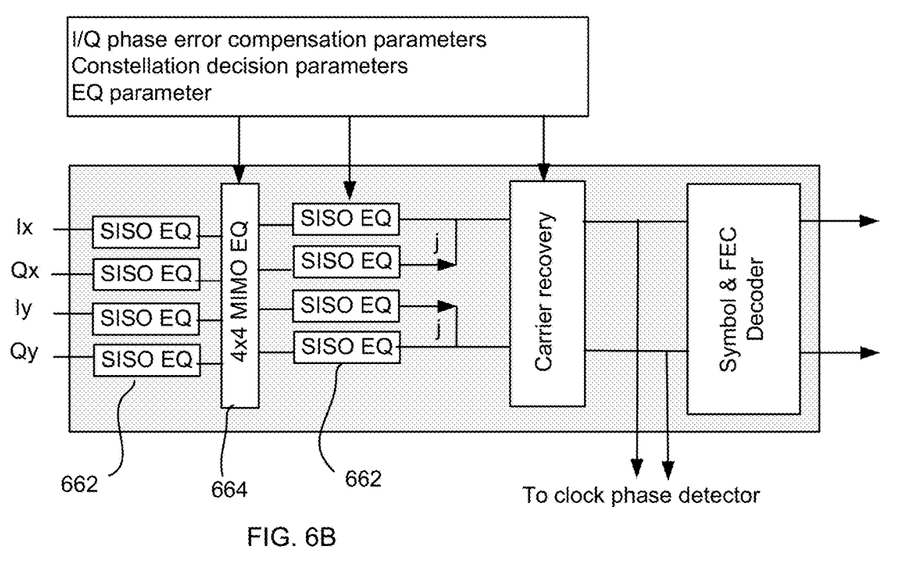

FIGS. 6A and 6B illustrate further example implementations. In FIG. 6A, single-tap 4×4 MIMO equalizer 664 may be implemented before SISO bandwidth equalizers 662. In FIG. 6B, the single-tap 4×4 MIMO equalizer 664 may be implemented between the four SISO bandwidth equalizers 662. In this example, the same number of SISO bandwidth equalizers may be used as in FIG. 6A, but the inputs may be split in half, thereby making it more powerful.

The four SISO equalizers 662 and the single-tap 4×4 MIMO equalizer 664 may be optimized independently, or they may also be optimized jointly as a single equalizer. For example, referring to the implementation shown in FIG. 6B, the tap of the 4×4 MIMO equalizer can be selected as the central tap, while the left SISO equalizer taps as the precursor taps and the right SISO equalizers as the post-cursor taps, or vice versa depending on the definition. Such a design could increase bandwidth equalization capability without increasing the actual equalizer tap length.

Additionally, the four real-valued SISO equalizers may be replaced by two mixed-value SISO equalizers (one mixed-value SISO equalizer per polarization), where the input signals to the mixed-value SISO equalizer are complex-valued numbers, which can be expressed by $Ix+jQx$ for x-polarization and $Iy+jQy$ for y-polarization, but the coefficient for each mixed-value SISO equalizer tap can be chosen to be either real-valued number or complex-valued number. If all the equalizer taps are designed to have real-valued coefficients, both the performance and implementation complexity for the two mixed-value SISO equalizer will be similar to the 4 real-valued SISO equalizer. If a portion of the mixed-value SISO equalizer taps (e.g. the middle three taps) are designed to have complex-valued tap coefficients, then the implementation complexity will increase, but fiber CD tolerance will also improve.

Figure 7:
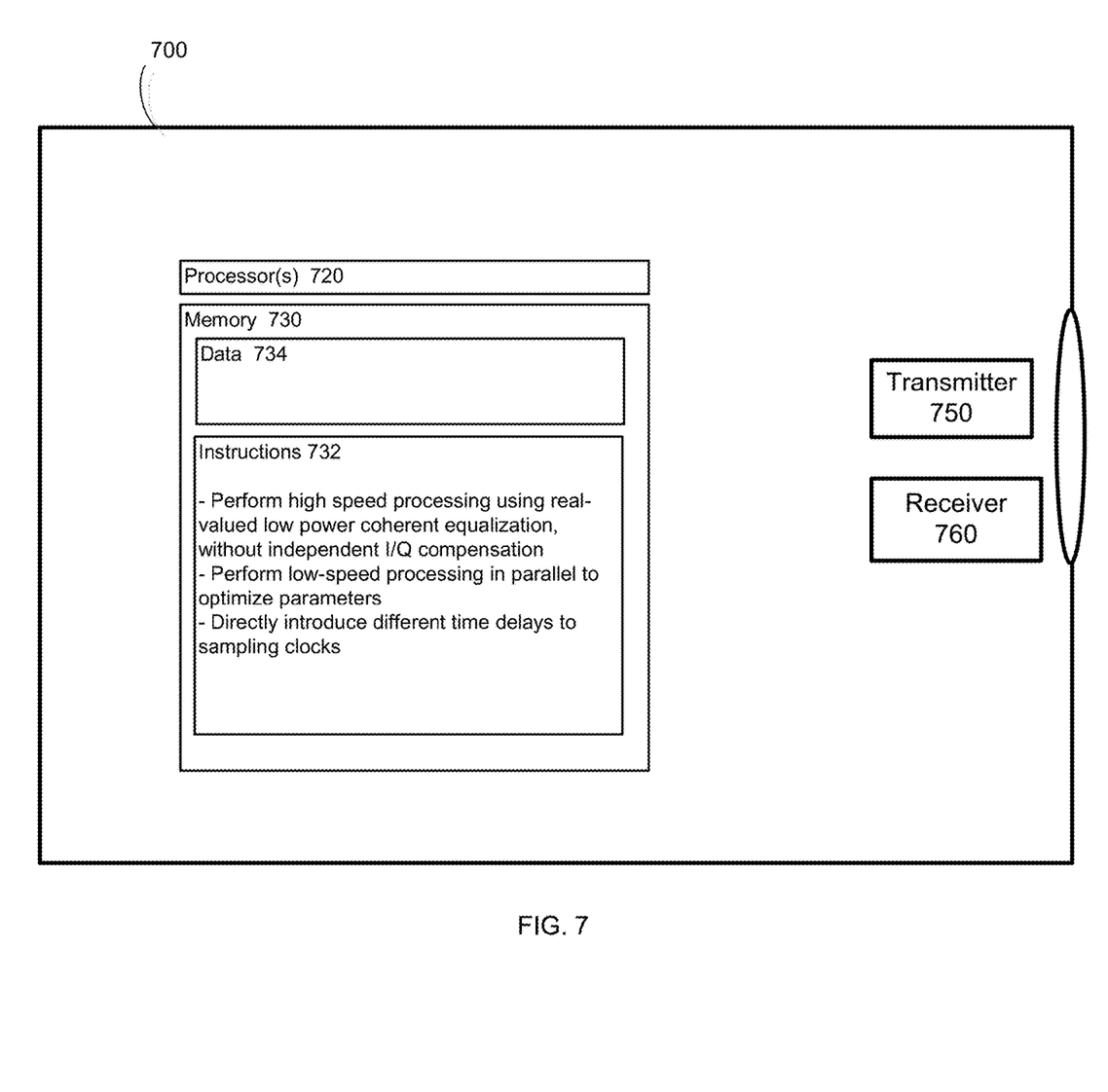
FIG. 7 is a block diagram of an example node according to aspects of the disclosure.

FIG. 7 is a block diagram illustrating an example node 700, such as datacenter switch. The node 700 includes various components, including one or more processors 720, memory 730, and other components typically present in switches, routers, servers, or other nodes. The one or more processors 720 may be in communication with other components of the node 700, such as transmitter 750, receiver 760, and other components that are not shown, such as fibers, amplifiers, circuitry, wiring, etc.

The memory 730 stores information accessible by processor 720, including instructions 732 and data 734 that may be executed or otherwise used by the processor 720. The memory 730 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 732 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 734 may be retrieved, stored or modified by processor 720 in accordance with the instructions 732. For instance, although the system and method is not limited by any particular data structure, the data may be stored in computer registers, in a relational database as a table having a plurality of different fields and records, XML documents or flat files. The data may also be formatted in any computer-readable format. The data may comprise any information, such as numbers, descriptive text, proprietary codes, references to data stored in other areas of the same memory or different memories (including other network locations) or information that is used by a function to calculate the relevant data.

The processor 720 may be any conventional processor, such as processors from Intel Corporation or Advanced Micro Devices. Alternatively, the processor may be a dedicated device such as an ASIC. Although FIG. 7 functionally illustrates the processor, memory, and other elements of the node 700 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The transmitter 750 may include any commercially available components, or it may have specialized hardware. The receiver 760 may include the components described above in connection with FIGS. 3-6. While the transmitter 750 and receiver 760 are shown as separate entities, it should be understood that they may be a single transceiver unit.

Figure 8:
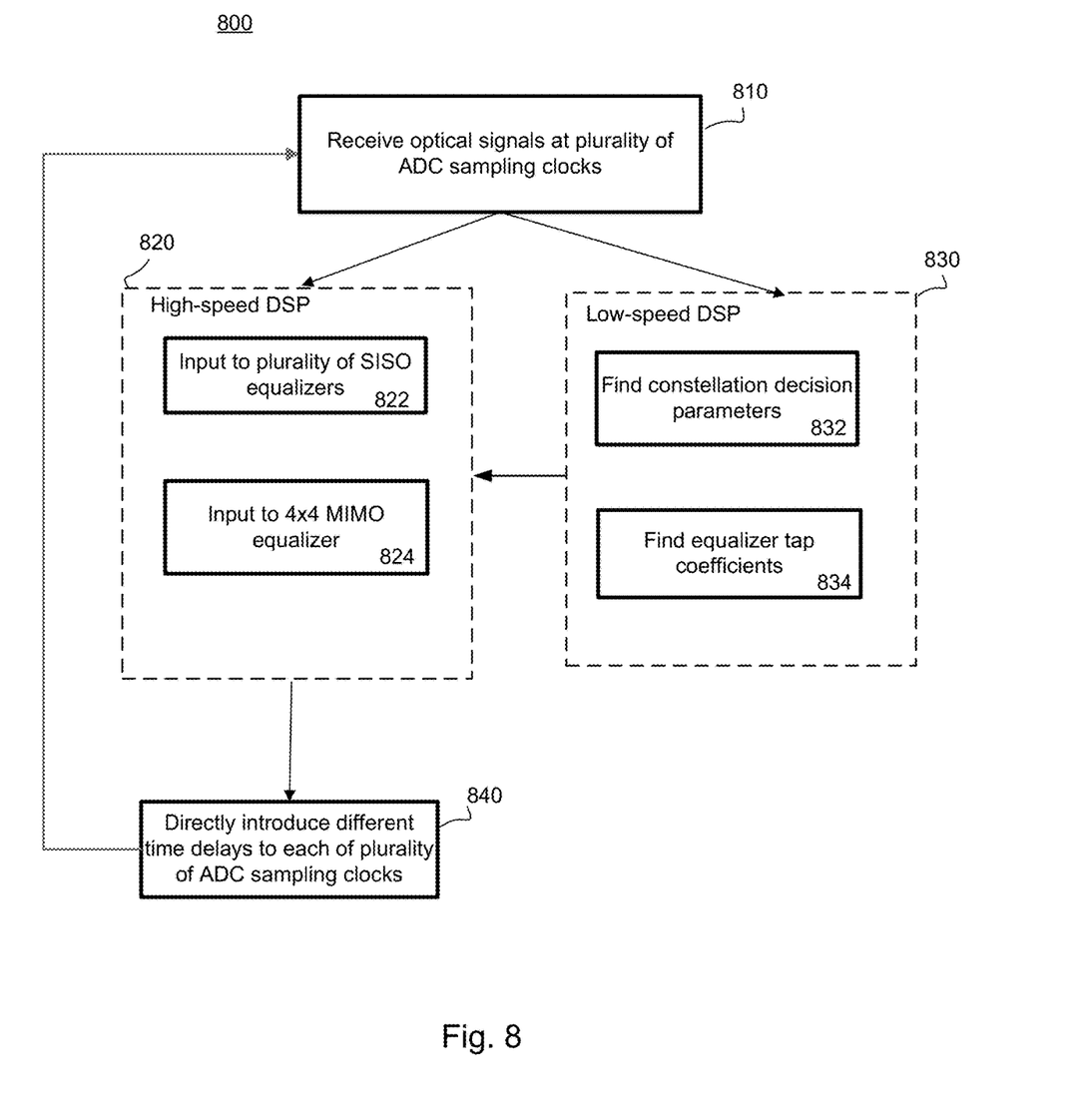
FIG. 8 is a flow diagram illustrating an example method according to aspects of the disclosure.

FIG. 8 illustrates a method 800 of receiving short range optical signals at a coherent receiver. The method 800 may be performed by, for example, a network node including the coherent receiver. While the operations associated with the method 800 are described in a particular order, it should be understood that they may be performed in a different order or simultaneously. Moreover, operations may be added or omitted.

In block 810, a plurality of optical signals are received at a plurality of ADC sampling clocks. The plurality of optical signals may include in-phase and quadrature signals, each having x and y polarizations. One signal may be received at each ADC sampling clock. Accordingly, for example, a system designed for receiving four individual signals will include four ADC sampling clocks.

In block 820, high-speed digital signal processing is performed in parallel with low-speed digital signal processing of block 830. The high-speed DSP may be executed without an independent I/Q compensation unit. Rather, the high-speed DSP may include performing SISO equalization at a plurality of real-valued or mixed-valued SISO equalizers, and MIMO equalization at a real-valued MIMO equalizer. While SISO equalization (block 822) is illustrated first, it should be understood, as discussed above, that MIMO equalization (block 824) may alternatively be performed first. In other examples, the MIMO equalizer may be between SISO equalizers.

In block 830, the low-speed DSP may be executed to identify or optimize one or more parameters for input to the high-speed DSP. For example, the low-speed DSP may find constellation decision parameters (block 832), equalizer tap coefficients (block 834), or any of a variety of other parameters. The low-speed DSP may perform, for example, block-by-block processing.

In block 840, skew adjustment is performed by directly introducing different time delays to the plurality of ADC sampling clocks. This may be performed without a dedicated skew compensation unit. Rather, introduction of the time delays may be performed as part of a clock recovery loop and may be based on baud rate clock phase error detection. The time delays are used in further receipt and processing of optical signals.

The skew-adjustment techniques described above enable lower-power baud-rate sampling and equalization technology for coherent systems. The real-valued coherent equalization technique reduces coherent equalizer implementation complexity by about 75%. About 30% overall coherent receiver power and area/cost reduction is achievable with combined use of both technologies. Furthermore, the proposed dual-DSP architecture enables the use of more advanced DSP algorithms to improve the coherent receiver performance with negligible power and cost impact.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of processing received optical signals at a coherent receiver, the method comprising:
receiving, at a plurality of analog-to-digital converter (ADC) sampling clocks, each for performing baud-rate ADC sampling, a plurality of separate optical signals;
performing, at a high-speed digital signal processor (DSP) high-speed processing of each of the plurality of signals, without an independent in-phase/quadrature (I/Q) phase compensation unit, wherein the processing comprises using two different types of real-valued equalizers, and using two different types of real-valued equalizers comprises inputting the plurality of signals to respective real-valued multi-tap single input single output (SISO) equalizers and a real-valued single tap multiple input multiple output (MIMO) equalizer, and wherein the SISO equalizers and the MIMO equalizer are used for simultaneous polarization recovery, in-phase and quadrature phase error correction, and bandwidth equalization; and
directly introducing different time delays to each of the plurality of ADC sampling clocks, wherein the time delays are generated according to feedback that is based on output from a common baud rate clock phase error detector, and wherein the common baud rate clock phase error detector receives input based on the bandwidth equalization and polarization recovery processing.

2. The method of claim 1, wherein directly introducing the different time delays to each of the plurality of ADC sampling clocks comprises using a plurality of separate delay adjustable clock buffers following clock distribution in a clock recovery loop.

3. The method of claim 1, wherein directly introducing the different time delays to each of the plurality of ADC sampling clocks comprises using a separate voltage controlled oscillator (VCO) in a clock recovery loop for each ADC sampling clock, each VCO using information from the common baud rate clock phase error detector.

4. The method of claim 1, wherein one signal is received at each of the plurality of ADC sampling clocks, and wherein the plurality of separate optical signals include in-phase signals and quadrature signals, each having x and y polarizations.

5. The method of claim 1, wherein the output of each SISO equalizer is input into the MIMO equalizer.

6. The method of claim 1, wherein the output of the MIMO equalizer is input into the plurality of SISO equalizers.

7. The method of claim 1, further comprising executing a low-speed DSP in parallel with the high-speed DSP, the low-speed DSP performing block by block DSP.

8. The method of claim 7, wherein the low-speed DSP finds at least one of optical constellation decision parameters, I/Q phase error compensation parameters or optimal equalizer tap coefficients for input to the high-speed DSP.

9. A low-power coherent optical receiver, comprising:
a plurality of analog-to-digital converter (ADC) sampling clocks adapted to receive a plurality of separate optical signals, each ADC sampling clock being operable to perform baud-rate ADC sampling;
a high-speed digital signal processor (DSP) configured to perform high-speed processing of each of the plurality of signals, without an independent in-phase/quadrature (I/Q) phase compensation unit, wherein the high-speed DSP comprises two different types of real-valued equalizers, and the two different types of real-valued equalizers comprise a plurality of multi-tap single input single output (SISO) equalizers and a single-tap multiple input multiple output (MIMO) equalizer, and wherein the SISO equalizers and the MIMO equalizer are used for simultaneous polarization recovery, in-phase and quadrature phase error correction, and bandwidth equalization; and a baud rate clock phase error detector in a clock recovery loop that directly introduces different time delays to each of the plurality of ADC sampling clocks, wherein the time delays are generated according to feedback that is based on output from the baud rate clock phase error detector, and wherein the baud rate clock phase error detector receives input based on the bandwidth equalization and polarization recovery processing.

10. The receiver of claim 9, wherein the clock recovery loop further comprises a plurality of separate delay adjustable clock buffers following clock distribution.

11. The receiver of claim 9, wherein the clock recovery loop further comprises a separate voltage controlled oscillator (VCO) for each ADC sampling clock, each VCO using information from the baud rate clock phase error detector.

12. The receiver of claim 9, wherein each of the plurality of ADC sampling clocks is configured to receive one optical signal of the plurality of separate optical signals, the plurality of separate optical signals including in-phase signals and quadrature signals, each having x and y polarizations.

13. The receiver of claim 9, wherein the output of each SISO equalizer is input into the MIMO equalizer.

14. The receiver of claim 9, wherein the output of the MIMO equalizer is input into the plurality of SISO equalizers.

15. The receiver of claim 9, further comprising a low-speed DSP in parallel with the high-speed DSP, wherein the low-speed DSP is configured to perform block by block DSP.

16. The receiver of claim 15, wherein the low-speed DSP is configured to find at least one of optical constellation decision parameters, I/Q phase error compensation parameters, or optimal equalizer tap coefficients for input to the high-speed DSP.

* * * * *